April 26, 1960 N. B. AKESSON 2,934,241
COMPRESSED AIR-POWERED DEVICE FOR FLUIDIZING, METERING
AND DISTRIBUTING DUST MATERIALS
Filed Nov. 23, 1956 2 Sheets-Sheet 1

INVENTOR.
NORMAN B. AKESSON
BY A. Donham Owen
ATTORNEY

April 26, 1960 N. B. AKESSON 2,934,241

COMPRESSED AIR-POWERED DEVICE FOR FLUIDIZING, METERING AND DISTRIBUTING DUST MATERIALS

Filed Nov. 23, 1956

INVENTOR.
NORMAN B. AKESSON
BY A. Donham Owen
ATTORNEY

United States Patent Office 2,934,241

Patented Apr. 26, 1960

1

2,934,241

COMPRESSED AIR-POWERED DEVICE FOR FLUIDIZING, METERING AND DISTRIBUTING DUST MATERIALS

Norman B. Akesson, Davis, Calif., assignor to The Regents of The University of California, Berkeley, Calif.

Application November 23, 1956, Serial No. 623,890

17 Claims. (Cl. 222—1)

This invention relates to an improved duster, and an improved dusting method. More particularly, it relates to a method for accurately metering and distributing finely particulate materials and to a compressed-air power device for doing so. The invention is particularly suited to the application of insecticidal and fungicidal dusts to plants, although it is not restricted to such use.

While large crop areas may be dusted by airplanes or by wheel-mounted rigs, smaller crop areas such as are typical for indoor ornamental crops (e.g., flowers in greenhouses and lath-houses) have heretofore been dusted by hand-operated machines. The operation of these machines has been tiresome and slow, and the tendency of the various dusts to pack has made it difficult to dislodge them from the duster. The present invention has solved these problems by fluidizing the dust just before ejecting it from the duster.

When dusting materials are taken from their package, they feel hard and dense, normally having a bulk density of about 40 to 60 pounds per cubic foot. According to this invention, compressed air is passed through a portion of the dust to fluidize it. (By the term "fluidization," I mean that the dust contains and holds enough air to reduce its density by one-third or one-half, depending upon the particle-size of the dust, so that the dust behaves like a liquid instead of like a solid and is easily handled in the duster.) The density of the fluidized dust is reduced to about 30 pounds per cubic foot, and its viscosity and internal sheer are greatly lessened and more nearly constant; so the dust is easily moved, mixed in an airstream, and discharged at a chosen rate and at great speed.

The present invention is characterized by restricted fluidization brought about by air impingement. By "restricted fluidization" I mean that only a small proportion of the dust in a relatively large container is actually fluidized at any one time. A small volume of controlled size is kept fluidized and is continually replenished as the dust is discharged. The fluidized portion is located at the bottom of the dust container so that as one portion of the dust is fluidized and moved away, more dust falls down into the fluidization zone.

This partial or restricted fluidization contrasts with prior-art attempts to fluidize all the dust in a container. That practice was markedly inefficient. Reports indicate a maximum controllable flow rate of 10 pounds per hour, as compared to about 120 pounds per hour from the device of this invention. A two-horsepower compressor used with my invention, for both air fluidizatoin and a venturi-type spreader, gives excellent pest control, while with total fluidization (without separation of the fluidizing and spreading air) the velocity of projection has been much too small and pest control has been much less effective. The velocity of projection of the dust is important because it is a major factor in the even distribution and adhesion of the dust. Tests have shown that 82%–90% pest control, i.e., effectiveness of the dust, at a velocity of about 3 to 5 m.p.h. could be increased to 98% effectiveness or pest control merely by increasing the velocity of projection up to about 6 to 8 m.p.h., while everything else remained the same. With velocity slower than 3 m.p.h., effectiveness may drop below 50%. Thus the present invention can utilize compressors more efficiently and can use a much smaller compressor than can a total-fluidization device.

Another problem with devices employing total fluidization may best be illustrated by a quotation from a report by J. B. Dunn of Cambridge for The British Society for Research in Agricultural Engineering, published by the (British) National Institute of Agricultural Engineering in August 1951 and entitled "Trial of the Willet and Robinson Dust Gun." The report shows that a forced feed, relying on total fluidization, has serious limitations:

"The forced feed did not prove as satisfactory as first impressions suggested . . ."

"Though superior to many agitated gravity feeds, the forced feed was still imperfect. In the absence of any agitation of the container a cavity was produced in the dust by the air supply. The incoming air blew through this cavity straight to the outlet tube picking up only a small quantity of dust or none at all. This defect was greater the smaller the amount of dust in the container and occurred with talc when the container was almost ¾ full."

The invention is also characterized by the fact that fluidization is accomplished by impingement of an airstream, rather than by mechanical agitators or fluidizing screens. This results in substantial savings in materials and power and gives a selective partial fluidization providing excellent flow control directly adjacent the ejection portion of the dust container.

In my invention, the fluidizing air is directed against the bottom of the dust container, impinges thereon, and releases its energy to turbulence. This controlled turbulence resulting from the impinging air erodes the dust that surrounds the air bubble formed at the entrance to an exhaust conduit, thereby continually agitating or bringing fresh dust into the fluidizing area.

Fluidization and agitation take place simultaneously; through proper control of air pressure and rate of air flow the packed dust in the container is (*a*) eroded or agitated, (*b*) fluidized (*c*) carried upward through the exhaust conduit to a venturi, where the principal driving and spreading of the dust takes place.

The use of "impinging air" eliminates the need for mechanical agitation or shakers to maintain uniform dust flow. All other dusting devices depend on mechanical loosening or agitation of the dust followed by fluidization, or entire tank fluidization without specific area agitation (Willet and Robinson), or mechanical agitation and mechanical fluidization such as a vertical auger hopper.

One object of this invention is to provide a novel air-powered duster that may be held in one's hand and used for rapid dusting of ornamental crops, either outdoors or within structures such as greenhouses. Control of structural pests (termites, and the like) may be effected by dusts blown into attics, walls, and crawl spaces.

Another object of the invention is to provide a very mobile dusting device for use in relatively small areas, but so constructed as to enable great speed of operation for rapid coverage of relatively large areas. As an example of the accomplishment of this object, a rose grower with 90,000 square feet of glasshouse and permanent air lines, air couplers, etc. can reach every place in his glasshouse with about 200 feet of rubber hose. Dusting can be accomplished, by means of this invention, at a rate of about 21,000 square feet per hour, as compared with about 7,000 square feet per hour for liquid spray applications and even slower for prior-art dusting.

Another object of the invention is to provide an efficient method for dispensing pesticidal dusts and the like.

Another object of the invention is to provide a simple, efficient, and inexpensive apparatus for dispensing pesticidal dust.

Another object of the invention is to provide fluidization without diverting a substantial proportion of the air from the feed line.

Other objects and advantages of the invention will appear from the following description of a preferred embodiment thereof.

Figure 1:
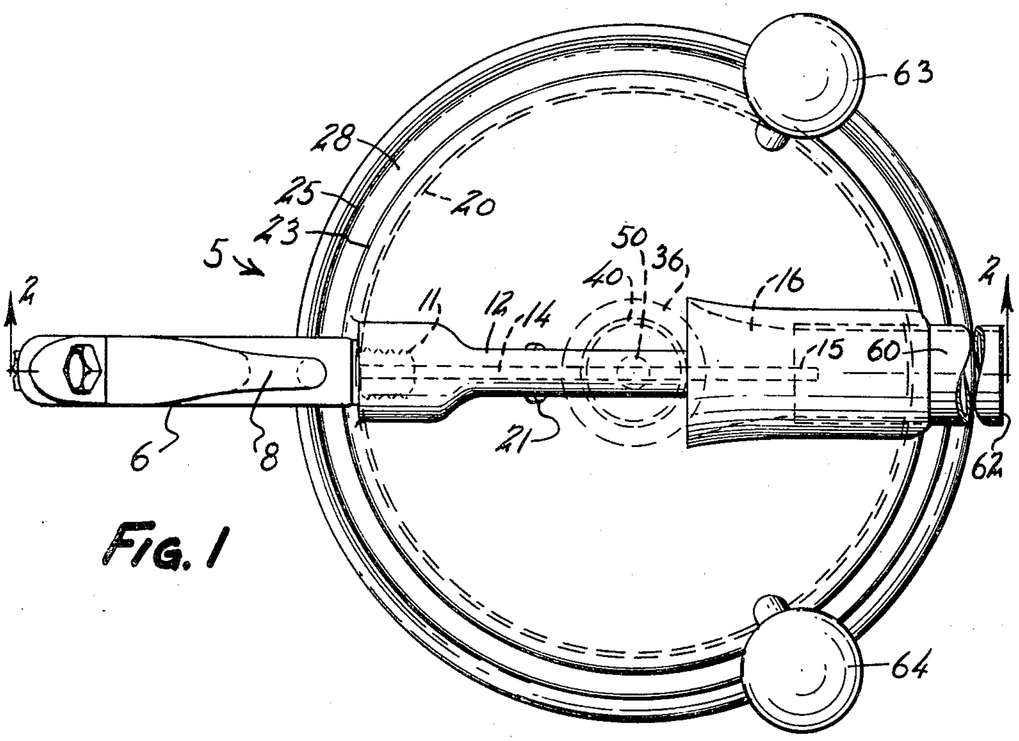
Fig. 1 is a top plan view of a dusting gun embodying the principles of this invention, a portion of the ejector tube being cut off to conserve space.

The dust gun 5 of this invention includes a support handle 6 with a trigger-type, spring-urged, valve-operating lever 7 and a hook 8 by which the device can be hung up when not in use. A generally central passage extends through the handle 6 from a fitting 10 that is suitable for attachment to a suitable source of a fluidizing and ejecting fluid to a fitting 11 that is attached to a housing member 12. Compressed air, preferably at a practical range of between 25 and 100 p.s.i., may be the fluid used, and in a typical device the flow rate may vary from 10 to 15 cubic feet per minute, depending upon the spreading of the dust desired, control being provided by a cutoff valve controlled by the trigger 7.

The housing 12 may be bored to provide a main air passage 14 that leads to a tube 15 from which the main portion of the air enters a venturi 16. A small fluidizing stream of air leads from a juncture 17 with the main passage 15 through a side conduit 18 to a dust container 20, via a fluidizing control valve 21.

The dust container 20 may be generally cylindrical with a closed upper end 22 secured to a disc-shaped base portion 23 of the housing member 12. A bracing member 24 may connect the container 20 directly with the handle 6. The diameter of the container 20 is preferably in the range of ⅓ to ¼ its height to obtain the maximum amount of emptying of the container. The lower end 25 of the container 20 is open, being normally closed, however, by a removable cover 26. Leakage is prevented by a gasket 27 seated between a shoulder 28 of the container 20 and a rim 29 of the cover 26. The cover 26 is preferably curved or dome-shaped with a relatively narrow diameter, flat central portion 30, and a fairly sharply curved main portion 31 extending up to the rim 29. The center of the cover is preferably provided with a reinforced impingement disc 32 against which the fluidizing air-stream impinges. A curved leaf 33 of spring steel may fit under the cover 26 with its ends 34 locked into detents 35 projecting from the wall of the container 20 for holding the leaf 33 and cover 26 in place.

Supported centrally by an annular depending portion 36 of the upper end 22 of the container 20 is a generally cylindrical tube 40 extending downwardly and open at its lower end 41, which is spaced a short distance away from the bottom end 30 of the cover 26, preferably about ½" to ¾". Suitable conduit means 42 through the depending portion 36 are provided, leading from the upper end of the tube 40 into the venturi 16, for carrying the fluidized dust to the gun outlet. Preferably, an offset portion 43 is provided in the conduit 42 to reduce the fall-through of dust to the conduit's outlet 44 when the container 20 is filled in its inverted position.

A short distance above the bottom 41 of the tube 40 a limiting screen 45 may be provided, preferably held in place by a split metal ring 46, or by other suitable means. The screen 45 does not significantly resist flow of fluidized dust but provides an increasing resistance to flow as the dust flow increases, thereby resisting the natural tendency of the flow to increase. The screen 45 therefore helps to prevent packing of dust into the tube 40, and the overflow of dust when the device is stopped. It also helps to discourage an initial puff of thick dust on re-starting.

The inside diameter of the vertical tube 40 may be about one inch or may lie in the range between ⅞" and two inches. This diameter may be varied with the quantity of dust or flow rate desired, to provide compensation. A flow of one to two cubic feet per minute in a tube that has a diameter of ⅞" will lift the fluidized dust adequately. A velocity of two to three c.f.m. is required in a 1½" tube 40.

Inside the cylindrical tube 40 and generally concentric therewith is a small fluidizing-air tube 50, which is connected at its upper end to the fluidized-air conduit 18. Its lower end 51 is opposite to and preferably spaced about 3/16" to ¼" from the impingement disc 32 in the cover 26. The relatively small amount of air passing down through the tube 50 impinges against the plate 32 and is deflected therefrom with great turbulence. This turbulence is sufficient to eat into the packed dust D and fluidize a small proportion of it in a fluidizing zone Z lying between the lower end 41 of the larger tube 40 and the bottom portion 30 of the container 20. The resistance of the dust D helps keep the zone Z small. Enough air is provided to fluidize only the small zone Z—normally less than one-hundredth of the container 20 volume—and to lift the easily-moved fluidized dust from the zone Z up the tube 40 to the outlet conduit 42, where the venturi 16 provides suction to help move the fluidized dust. Preferably, the separate air-control valve 21 is established in the fluidized-air conduit 18, so that the flow of air through the fluidized conduit 18 and tube 50 can be increased or decreased to accommodate the extreme variation in flowability of the various types of dust that may be used, this difference being due, apparently, to their particle size, density, and cohesion. Such a valve 21 also may be closed to overcome the tendency of the dust to continue to flow after the main valve 7 has been closed, passing up the vertical tube 40 and out the conduit 42, so that the dust spills over, not only causing waste but, in the case of poison dusts, creating a situation very dangerous to the operator.

A further adjustment may be provided by a tip or jet 52 at the bottom of the fluidizing-air tube 50, which may be regulated to provide more energy at that point. A replaceable orifice 53 may be provided to serve as the limiting device for air flow, the maximum expansion of the air taking place at the tip or jet 52 instead of in the tube 50 or back at the valve 21. Then the tube 50 or valve 21 limits the flow, and the air velocity at the tip 52 is lessened with a lowering of energy there. The limiting orifice 53 is not as important when the valve 21 is used as when the valve 21 is absent. Thus, air coming out from the jet or tip 52 and striking the impingement plate 32 fluidizes a small volume of dust and drives it back up and around the inside of the larger tube 40.

The outlet conduit 42 from the upper end of the larger tube 40 conducts the fluidized dust into the venturi 16 that lies in a discharge tube 60, wherein not only the fluidized dust but also air in large amounts is drawn in through a venturi port 61 as a result of the conversion of pressure to flow of the main discharge air. Thus, with the air being discharged from the tube 60 outlet 62 at approximately 135 c.f.m., the line pressure may be about 80 c.f.m.—17 c.f.m. coming from the compressed air tube 15 and the other 118 c.f.m. being drawn in through the port 61. The venturi 16 may be provided by having the tube 15 extend into the tube 60 and by providing a bell or flared end 63 of the tube 60, spaced from the housing 12 to provide the ports 61.

Figure 4:
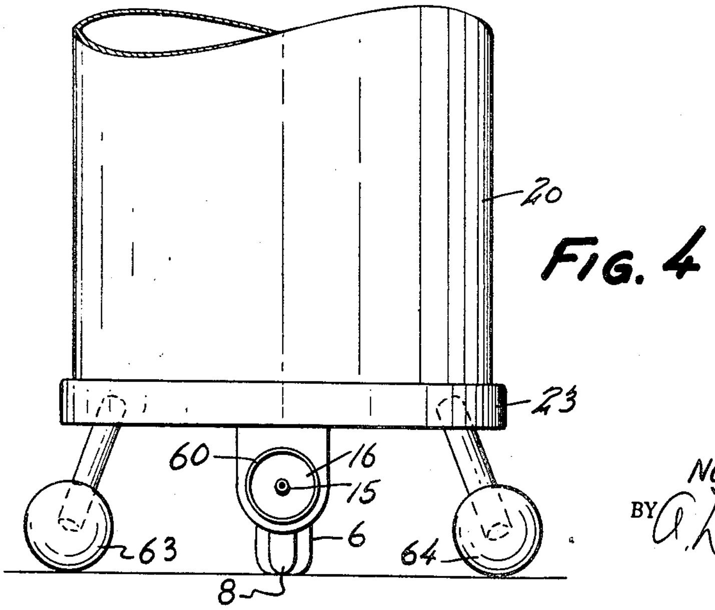
Fig. 4 is a view in elevation of the gun in its inverted position for loading, or when not in use.
Figures 2, 3:
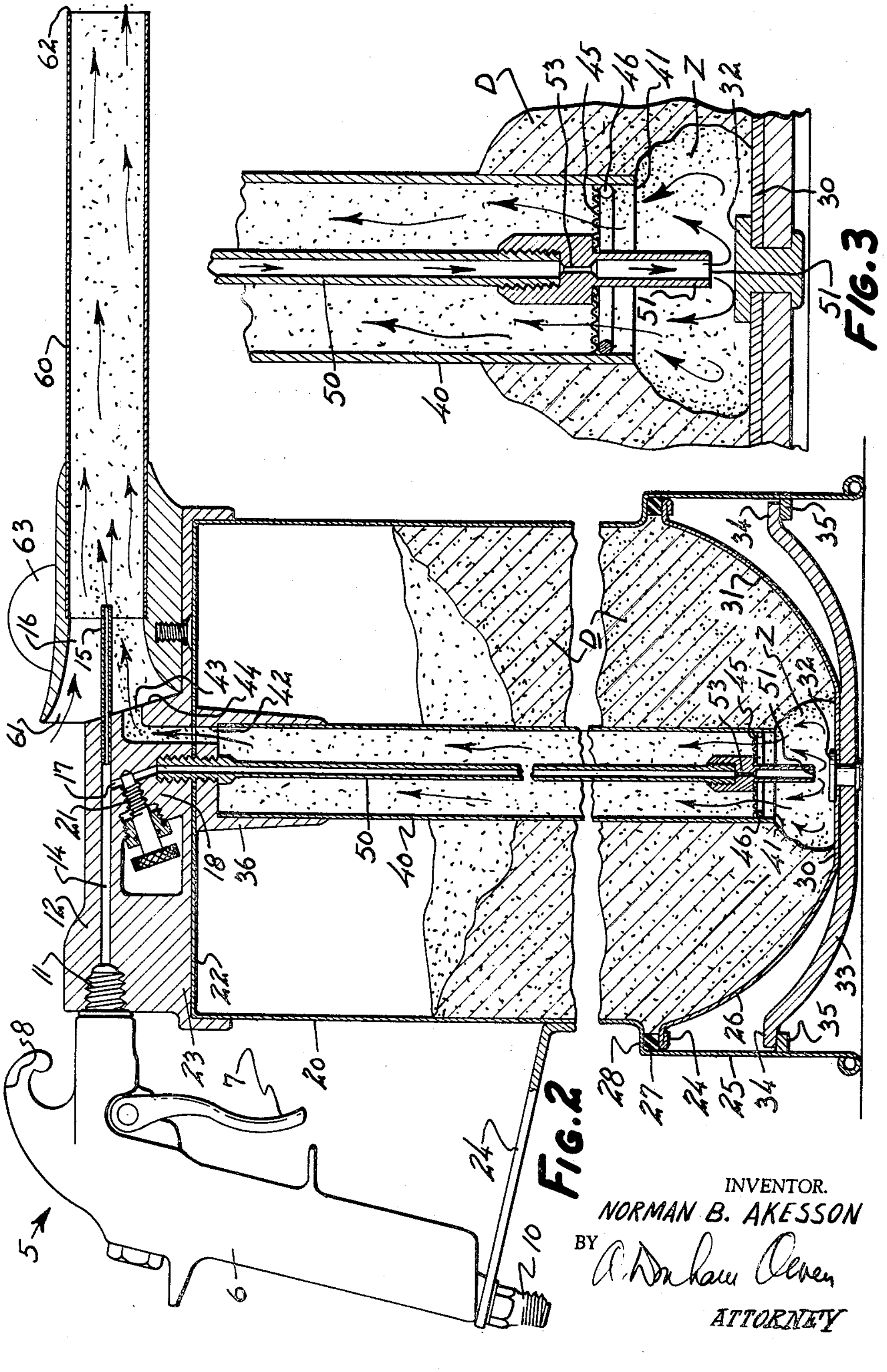
Fig. 2 is a view in section of the dusting gun of Fig. 1, taken along the line 2—2 of Fig. 1, and showing the full length of the ejector tube.
Fig. 3 is a view of a portion of Fig. 2 on an enlarged scale, showing the fluidizing zone.

The disc portion 23 of the housing member 12 is preferably provided with a pair of handle knobs 63 and 64, which make it possible for an operator to hold the gun 5 with one hand on the handle 6 and one on one of the two knobs 63 or 64. Also, when the container 20 is to be filled, the fact that the upper surfaces of the knobs 63 and 64 are level with the upper surface of the hook 8 makes it possible to invert the gun 6, resting it on the three "legs" provided by the hook 7 and knobs 63 and 64. (See Fig. 4.) Then the cover 26 is removed by turning the leaf spring 33 to release it from the detents 34. Dust may then be poured in, and the cover 26 and retainer 33 put back in place. The pressure of the spring 33 holds the cover 26 tightly in place. The knob 63 may be connected to or provide the control handle for the control valve 21, thereby permitting control of the dust flow by the hand supporting the duster.

In operation, the gun is connected by suitable tubing to the compressed air line and is held in one or both hands, or with additional support, if desired. Upon opening the valve 7, a stream of air is projected out the tube 15, drawing in air through the port 61 and projecting it out the outlet 62 of the discharge tube 60. When the valve 21 is slowly opened, fluidizing air goes down through the inner tube 50, passes through the orifice (if one is used), goes out the tip 52, and strikes against the impingement plate 32, which deflects it back and out to the side in a very turbulent manner. The turbulent air penetrates the dust D lying in the bottom with a substantial amount of air and fluidizes the air in the small zone Z. It also lifts up air into the larger tube 40. At the same time, the mainstream of compressed air passing through the venturi 16 not only draws in air through the port 61 but also exerts a small amount of suction upon the outlet 44 leading from the fluidized dust tube 40. The air flow and suction carry the fluidized dust and mix it in the venturi 16 with the air from the tube 15 and port 61 to provide a thoroughly dispersed stream of dust in large quantities that issues at considerable velocity (e.g. at about 175 m.p.h. when the air line pressure is about 80 p.s.i.) from the outlet 62 of the gun. Over a distance of about 8 to 10 feet from the nozzle 62, the velocity drops to about 10 m.p.h., while at about 16 to 18 feet the velocity is still about 5 m.p.h. A velocity of 5 m.p.h. is considered about the minimum for obtaining coverage of the plant surfaces with dust.

As the dust at the bottom is withdrawn in its fluidized state—normally about 15% dust and 85% air by volume—more dust falls into the zone Z, formerly occupied by the fluidized dust. This packed dust (so-called "bulk density," approximately 30% dust and 70% air) is then similarly fluidized and moved. This process goes on continuously. The fluidizing zone Z extends only around the bottom of the inner tube 40, a very small area compared with the total area of the container 12. This means, for one thing, that not much air is used in fluidizing and, for another thing, that the fluidizing is accomplished very efficiently, since the air has to fluidize only a small amount of dust and does it directly by the air impingement. Accurate control of the dust flow can be maintained by keeping the dust bubble small and controllable and this becomes possible by using the impingement method of fluidization. The fluidized dust continues to pass upwardly through the tube 40 and be sucked up through the venturi 16 and discharged from the output end 62 of the tube.

In this invention the relatively small proportion of the air that flows through the conduit 18 and tube 50 has the greater part of its energy consumed, with resultant lowering of its pressure, when it strikes the impingement plate 32. The expended energy produces turbulence, with a resultant small rise in temperature. Some further proportion of the energy is used in friction against the dust as it eats it away, and some more is used in imparting kinetic energy to the dust particles. The air pressure can be small, because only enough energy need remain after the fluidizing has been completed to lift the fluidized dust up the tube 40 to a position where the suction force from the venturi 16 will carry the dust through the conduit 42. No energy is consumed in supplying dust to the fluidizing zone because it falls there by gravity. For this reason, the space between the lower end 41 of the tube 40 and the closure member 26 should be sufficient to prevent arching over of the dust, which would result in a loss of fluidization.

It will be seen from the above that the important thing in the method is to provide a grossly agitated air portion in a fluidizing zone and then to conduct the fluidized dust directly away from said zone. Thus, it is evident that instead of conducting the fluidizing-air down the vertical tube 50, the air could be brought in through the side and turned down against the plate 32; similarly the tube 40 need not extend vertically for all its length but could pass out radially from just above the point 41, extend through the walls of the container 20, and then extend up separately outside it. One important thing is to get the impinging current of air down into the bottom of the container, so that the fluidizing will be accomplished there, where gravity can feed the dust into it. Another important thing is to carry away the fluidized dust directly from the fluidizing zone instead of from a locus remote therefrom. The man skilled in the art will readily appreciate that such a method utilizes the minimum amount of air at its maximum efficiency. This makes it possible for the main air stream through the tube 15 to exert the maximum amount of force for any given compressor, and thereby to project the dust out with the maximum velocity and to provide the maximum mixing of air at the venturi 16.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for feeding fine particulate material into an airstream, comprising fluidizing a small proportion only of said material in turbulent air, supplying additional air in a particular direction to maintain fluidization while withdrawing fluidized material in a different direction as fast as additional air is supplied, and mixing the fluidized material with a separate airstream.

2. A method for feeding dust into an airstream, comprising continuously fluidizing a small proportion only of said dust solely by continuously supply turbulent air in a particular direction, continuously withdrawing fluidized dust in a different direction, and mixing the fluidized dust with a separate airstream.

3. A method for accurately metering and distributing fine particulate material comprising continuously supplying air at a predetermined metered rate and in a particular direction to a fluidizing zone in said material wherein a small proportion of said material is fluidized in turbulent air, continuously supplying additional air and additional said material to said zone to maintain fluidization, continuously withdrawing fluidizing material directly from said zone in a direction different from that at which the air is supplied, and distributing said fluidized material.

4. A method of entraining and dispensing finely particulate material from a container, comprising impinging air against the lower end of said container so as to provide there a fluidizing zone small in proportion to the volume of the container, and removing the fluidized material in a stream directly from said zone and in a direction generally opposite to that of the entry of the impinging air, more particulate material dropping into said zone and more air being fed in as fluidized material is removed.

5. A method of entraining and dispensing dust from a container, comprising impinging air in the lower end of said container in a particular direction, fluidizing the dust adjacent thereto in a fluidizing zone small in proportion to the volume of the container, removing the fluidized material in a stream, in a different direction from the impinging air, directly from said zone, the impinging air passing into said air stream only indirectly, dropping by gravity more particulate material into said zone, and feeding more air in as the fluidized material is removed.

6. A method of dusting plants with fine particulate material from a container, comprising impinging air downwardly adjacent the lower end of said container at the bottom of said material so as to provide a fluidizing zone small in proportion to the volume of the container, and carrying away the fluidized material entrained in said air directly from said zone and in a direction such that the impinging air is carried away indirectly and after such impingement, particulate material continuing to drop into the zone and additional air being supplied as said fluidized material is removed, and sucking the fluidized material and atmospheric air into a venturi with a relatively powerful airstream, to mix the air and fluidized material, and projecting the mixture on said plants.

7. An apparatus for metering and distributing fine particulate material comprising a container having a downwardly and inwardly sloping lower end having a generally flat central end portion; means for impinging a small stream of air downwardly against said central end portion to provide a fluidizing zone wherein the particulate material is mixed with the impinging air as the material falls down into said zone; and means for withdrawing the fluidized material directly and upwardly from said zone.

8. An apparatus for metering and distributing fine particulate material comprising a distributing airstream directed through a venturi; a container for said particulate material having a sloping lower end; means for impinging a small stream of air against said container at said lower end to provide gross agitation that fluidizes a small proportion only of the particulate material at any one time, to provide a fluidizing zone at the bottom of said material into which additional said material may fall; and means for conducting fluidized material from said zone directly to said venturi.

9. An apparatus for metering and distributing fine particulate material comprising a distributing airstream directed through a venturi; a container having a sloping lower end surface with an impingement plate at the lowest portion thereof; means for impinging a small stream of air against said plate, so as to provide gross agitation in a zone small in comparison with said end surface wherein the particulate material is fluidized; and means to withdraw the fluidized material directly from said zone and convey it directly to said venturi.

10. A duster comprising a dust container having its lower end sloped down toward the center; a first imperforate tube of relatively small diameter extending into said container with its end spaced a short distance from the lower end thereof; a larger-diameter second imperforate tube spaced away from the bottom of said container a greater distance than said first tube; means for conducting air into said first tube; and fluidized-dust outlet means leading from the upper end of said second tube; a venturi into which the outlet means leads; and means for supplying high pressure air to said venturi for drawing in additional air and mixing it with the fluidized dust.

11. The duster of claim 10 wherein said means for conducting air into said first tube comprises a by-pass from said high pressure air supplying means.

12. The duster of claim 10 wherein said means for conducting air into said first tube is provided with valve means for regulating the flow therethrough.

13. A duster including in combination a dust container having an open lower end; a bowl-shaped closure cap for said lower end, with a flat central portion; a first imperforate tube of relatively small diameter extending into said container with its end spaced a short distance from said flat central portion; a larger-diameter second imperforate tube spaced away from the bottom of said container a greater distance than said first tube; means for conducting air into said first tube in controlled amounts; and fluidized dust outlet means leading from the upper end of said second tube; a venturi into which the outlet means leads, said venturi having air-intake means; and means for supplying air under pressure to said venturi for sucking in additional air through said air intake means, mixing it with the fluidized dust from said outlet means, and discharging it at high velocity.

14. The duster of claim 13 wherein said short distance is about 1/4".

15. A duster comprising a cylindrical container having its lower end sloped down toward the center with an impingement plate at the center thereof; a vertical first imperforate tube of relatively small diameter extending axially down into said container with its lower end spaced a short distance from said impingement plate; a larger-diameter vertical second imperforate tube surrounding said first tube, with its lower end spaced away from the bottom of said container a greater distance than the lower end of the first tube; air inlet means leading into said first tube; fluidized dust outlet means leading from the upper end of said container in between said tubes and closed off from all except the space between said tubes; a venturi into which the outlet means leads; and means for supplying high pressure air to said venturi for drawing in additional air and a stream from said outlet means.

16. The duster of claim 15 having perforated dust-flow-resisting means mounted in said second tube adjacent its lower end.

17. The duster of claim 15 wherein said air inlet means and said means for supplying high pressure air are connected to a common air conduit and wherein a flow-control valve is provided in said air inlet means.

References Cited in the file of this patent

UNITED STATES PATENTS

| | | |
|---|---|---|
| 1,241,437 | Pian | Sept. 25, 1917 |
| 1,911,367 | Kitto | May 30, 1933 |
| 2,123,537 | Marr | July 12, 1938 |
| 2,202,079 | Ayres | May 28, 1940 |
| 2,450,205 | Rose | Sept. 28, 1948 |
| 2,668,636 | Martin | Feb. 9, 1954 |
| 2,696,933 | Barclay et al. | Dec. 14, 1954 |
| 2,713,510 | Coanda | July 19, 1955 |
| 2,781,154 | Meredith | Feb. 12, 1957 |